United States Patent
Rho

(10) Patent No.: US 10,212,036 B2
(45) Date of Patent: Feb. 19, 2019

(54) PERFORMANCE TESTING METHOD, PERFORMANCE TESTING APPARATUS PERFORMING THE SAME AND STORAGE MEDIUM STORING THE SAME

(71) Applicant: LG CNS CO., LTD., Seoul (KR)

(72) Inventor: Seung Kab Rho, Seoul (KR)

(73) Assignee: LG CNS CO., LTD., Seoul (KR)

( * ) Notice: Subject to any disclaimer, the term of this patent is extended or adjusted under 35 U.S.C. 154(b) by 651 days.

(21) Appl. No.: 14/585,142

(22) Filed: Dec. 29, 2014

(65) Prior Publication Data
US 2016/0187231 A1 Jun. 30, 2016

(51) Int. Cl.
H04W 24/08 (2009.01)
H04L 12/26 (2006.01)
H04L 12/24 (2006.01)
G01M 99/00 (2011.01)

(52) U.S. Cl.
CPC ....... *H04L 41/0823* (2013.01); *G01M 99/007* (2013.01); *H04L 43/08* (2013.01); *H04W 24/08* (2013.01)

(58) Field of Classification Search
CPC ................................. G06F 9/44; H04W 24/08
See application file for complete search history.

(56) References Cited

U.S. PATENT DOCUMENTS

| | | | | |
|---|---|---|---|---|
| 7,269,805 B1 * | 9/2007 | Ansari | ..................... | G06F 11/27 716/136 |
| 8,264,972 B2 * | 9/2012 | Joyner | .................. | H04L 41/145 370/250 |
| 2007/0079289 A1 * | 4/2007 | MacCaux | ........... | G06F 11/3668 717/124 |
| 2007/0079291 A1 * | 4/2007 | Roth | .................... | G06F 11/3668 717/124 |
| 2008/0086348 A1 * | 4/2008 | Rao | ....................... | G06Q 10/063 705/7.11 |
| 2009/0199047 A1 * | 8/2009 | Vaitheeswaran | .... | G06F 11/3409 714/47.2 |
| 2010/0211336 A1 * | 8/2010 | Madrid | ................. | H01L 25/065 702/57 |

(Continued)

FOREIGN PATENT DOCUMENTS

| | | |
|---|---|---|
| KR | 10-0967525 | 6/2010 |
| KR | 10-1199485 | 11/2012 |

OTHER PUBLICATIONS

Fatoohi, "Performance Evaluation of Communication Networks for Distributed Computing", Computer Communications and Networks, 1995. Proceedings pp. 456-459.*

(Continued)

*Primary Examiner* — Regis J Betsch
(74) *Attorney, Agent, or Firm* — KED & Associates, LLP

(57) ABSTRACT

Provided is a performance testing method, a system and a storage medium for the same. The method may include determining test object metadata that defines a protocol for a test object and test job metadata that defines a performance test using a prescribed job, generating job data based on the test job metadata, generating load data according to the prescribed job to provide the load data to at least one test performing node among a plurality of test performing nodes coupled to the test object, and causing the at least one test performing node to perform the performance test for the test object.

11 Claims, 4 Drawing Sheets

(56) References Cited

U.S. PATENT DOCUMENTS

| | | | | |
|---|---|---|---|---|
| 2010/0333072 A1* | 12/2010 | Dulip | .................. | G06F 11/3419 |
| | | | | 717/128 |
| 2013/0262399 A1* | 10/2013 | Eker | ................. | G06F 17/30297 |
| | | | | 707/687 |
| 2013/0275946 A1* | 10/2013 | Pustovit | .............. | G06F 11/3684 |
| | | | | 717/124 |
| 2015/0099493 A1* | 4/2015 | Mathur | ................. | H04W 24/08 |
| | | | | 455/414.1 |
| 2015/0227453 A1* | 8/2015 | Bhattacharya | .... | G06F 17/30958 |
| | | | | 714/38.1 |

OTHER PUBLICATIONS

Ryu, "Design and Performance Evaluation of a Communication Protocol for an Information Communication Processing System", Singapore ICCW94 pp. 1200-1203.*

Gunningberg et al., "Application Protocols and Performance Benchmarks", Jun. 1989, IEEE Communications Magazine pp. 30-36 (Year: 1989).*

\* cited by examiner

PERFORMANCE TESTING METHOD, PERFORMANCE TESTING APPARATUS PERFORMING THE SAME AND STORAGE MEDIUM STORING THE SAME

BACKGROUND

1. Field

Provided is a performance testing technology, and more particularly to a performance testing method, a performance testing apparatus performing the same and storage medium storing the same using load data having a multi-dimensional array structure and a protocol plug-in component provided in a test performing node to test a performance of a system or a device using a prescribed protocol.

2. Background

Performance testing methods, apparatuses and storage medium storing the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Figure 1:
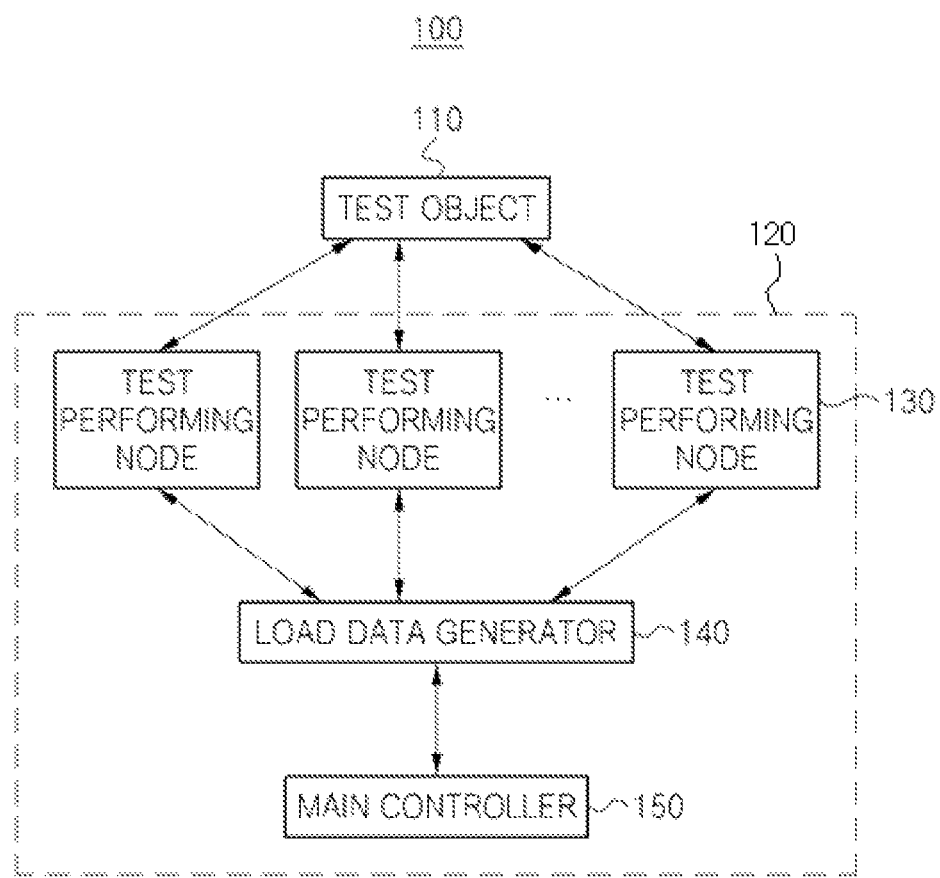
FIG. 1 is a block diagram of a performance testing system.

Various embodiments of the present disclosure are merely provided to facilitate structural or functional explanation, and hence the scope of the present disclosure should not be construed to be limited to the embodiments disclosed herein. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The present disclosure may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

In general, a method and apparatus for testing a performance of a system or a device using a general protocol (e.g., HTTP or TCP) exists. However, these methods and apparatuses may not be suitable for testing performance for a system or a device that uses various other types of protocols. Moreover, due to increased use of data on Internet Of Things (IoT) or other mechanical devices, there is a need for an improved method and apparatus which is capable of testing performance for systems or devices that use well known protocols as well as new or incompatible protocols.

In one example, an online performance test method between client/server and an apparatus thereof may secure a performance and a stability of an online game server application through a load test. A communicating procedure between many gaming clients and a server may be collected on a game server application step to be generated or to be regenerated. Therefore, it is possible to correctly test a performance of the game server and may correctly check a problem of the server application.

In another example, a system and a method may be provided for causing a load in a target system for a performance, load and function test and to perform the test while the load is generated on a test target system rather than on linked systems when the test target system is linked with a database system, external system or an additional system performing a specific logic on performing various tests.

As broadly described and embodied herein, an improved performance testing method is provided that enables testing a performance of a system or a device that uses various types of protocols. The performance testing method is capable of using load data having a three-dimensional array structure to flexibly test for performance independently of a performance test object. Moreover, the performance testing method of the present disclosure may enable processing load data through a protocol plug-in component for performing data input and output according to a performance test object protocol and expanding a protocol of a performance test object to test a performance of a target test object using a protocol among various types.

FIG. 1 is a block diagram of a performance testing system of the present disclosure. The performance testing system 100 may include a test object 110 (also target object or device) and a performance testing apparatus 120. The performance testing apparatus 120 may include at least one test performing node 130, a load data generator 140 and a main controller 150.

The test object 110 may be connected with the performance testing apparatus 120 to test performance of the test object 110. In an embodiment, the test object 110 may correspond to a system, a server or a device that uses a prescribed protocol, for example, the test object 110 may correspond to a IoT (Internet of Things) device or a manufacturing device. In an embodiment, the test object 110 may perform a specific work (also referred to herein as a job) that is requested from the performance testing apparatus 120 to provide a performance result to the performance testing apparatus 120.

The performance testing apparatus 120 may correspond to a computing device that is connected with the test object 110 to perform a performance testing method. For example, the performance testing apparatus 120 may be a desktop computer, a laptop, a smart phone or a tablet PC (Tablet Personal Computer). The performance testing apparatus 120 may send the specific job to the test object 110 and may test a performance for the test object 110 based on information related to performing/completing the specific job received from the test object 110. In an embodiment, the performance testing apparatus 120 may be connected with a plurality of test objects. Herein, the plurality of the test objects may correspond to systems, a servers or devices using different protocols.

The at least one test performing node 130 may correspond to a virtual machine that generates logging data (or log data) for performing the performance testing method. Here, the logging data may be generated based on a time in which the load data is sent to the test object 110 and a time in which the specific job is completed based on the load data from the test object 110.

In an embodiment, the at least one test performing node 130 may correspond to a computing device that is physically separate from the performance testing apparatus 120. For example, the at least one test performing node 130 may correspond to a desktop, a laptop, a smart phone or a tablet PC. In an embodiment, the at least one test performing node 130 may correspond to at least one of a virtual machine in the performance testing apparatus 120 and a virtual machine in a computing device physically separated and remotely located from the performance testing apparatus 120. The at least one test performing node 130 will be described in further detail with reference to FIGS. 2 and 3.

The load data generator 140 is connected to the main controller 150. The main controller 150 determines test object metadata and test work metadata to be provided to the load data generator 140. Herein, the test object metadata defines a protocol of the test object 110 and the test work metadata (or test job metadata) defines a test of the specific job. In an embodiment, the test object metadata may correspond to access information for the test object 110 and may include information for IP, Port and protocol type. For example, the test object metadata may correspond to {IP: 1.1.1.1 Port: 2, Protocol: Avro}.

The test work metadata may define a test of the specific work being requested to the test object 110, may correspond to structure information for actual data being obtained as a testing result of the specific job and may include parameters such as data total length, data type, a data generated time and packet version. For example, the test work metadata may be {data length: 100 byte, generated time: $YYYYMMDDHI-MIssSSS}.

In an embodiment, the main controller 150 may calculate a performance testing result for the test object 110 based on the logging data generated by the at least one test performing node 130. Here, an index of the performance test may correspond to a number of a work process per a specific time period. For example, the index of the performance test may indicate a number of specific jobs the test target 110 may concurrently process based on the load data received from the at least one test performing node 130.

The load data generator 140 may generate work data (or job data) based on the test work metadata. In an embodiment, the job data may define a specific job being requested to be performed in the test object 110 based on a test that uses the specific job defined through the test work metadata, and may include a definition for a specific data search work. For example, the job data may correspond to {100 byte, 1234ABCD~Z}. Herein, the job data may be changed according to a characteristic of the test object 110 and may not include a content for actual data.

In an embodiment, the load data generator 140 may generate the load data according to the specific job and may provide the load data to the at least one test performing node 130 to cause the at least one test performing node 130 to perform the performance test for the test object 110.

In an embodiment, the load data may correspond to a multi-dimensional array structure including the test object metadata, the test work metadata and the job data. Herein, the test object metadata and the test work metadata may be defined through the main controller 150 and the job data may be generated through the load data generator 140. For example, the load data may correspond to a byte type three-dimensional array structure. Herein, a first array may correspond to the test object metadata, a second array may correspond to the test work metadata and a third array may correspond to the job data.

Figure 2:
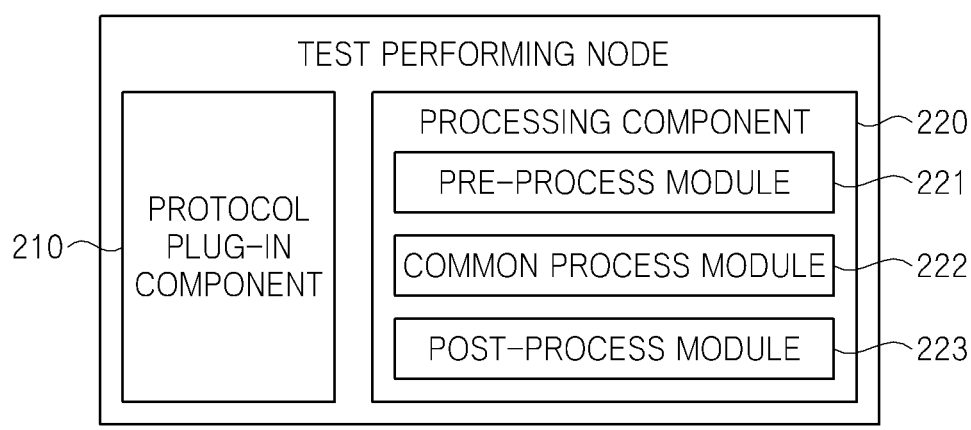
FIG. 2 is a block diagram of a test performing node of FIG. 1.

FIG. 2 is a block diagram of a test performing node of FIG. 1. The test performing node 130 may include a protocol plug-in component 210 and a processing component 220. The processing component 220 may include a pre-process module 221, a common process module 222 and a post-process module 223.

The protocol plug-in component 210 may connect with the test object 110 according to a protocol of the test object 110, request the specific job to the test object 110 and process a response. In an embodiment, the protocol plug-in component 210 may define the protocol as a library and may use the defined library to connect to the test object 110. That is, the protocol plug-in component 210 may use a dynamic link library (DLL) to be connected with the test object 110. Also, the protocol plug-in component 210 may process the load data to communicate through the protocol of the test object 110. The protocol plug-in component 210 will be described in further detail with reference to FIG. 3.

The pre-process module 221 of the processing component 220 may check the protocol of the test object 110 based on the test object metadata that is included in the load data and may cause a corresponding test performing node 130 to be connected to the test object 110 using the protocol of the test object 110.

The common process module 222 of the processing component 220 may generate the logging data based on an access time before sending the load data to the test object 110 and an access time after receiving a completion of performing the specific job from the test object 110. Herein, the logging data may be managed through a database. In an embodiment, the logging data may be (the access time on receiving the completion of performing the specific work—the access time on sending the load data) and may correspond to a time causing the test object 110 to perform the specific job.

In an embodiment, the common process module 222 may process data for a request time, request data, response data and response time of the specific job to store the corresponding data in the database. The post-process module 223 of the processing component 220 may terminate a connection with the test object 110 after the logging data is generated through the common process module 222 to be stored in the database.

Figure 3:
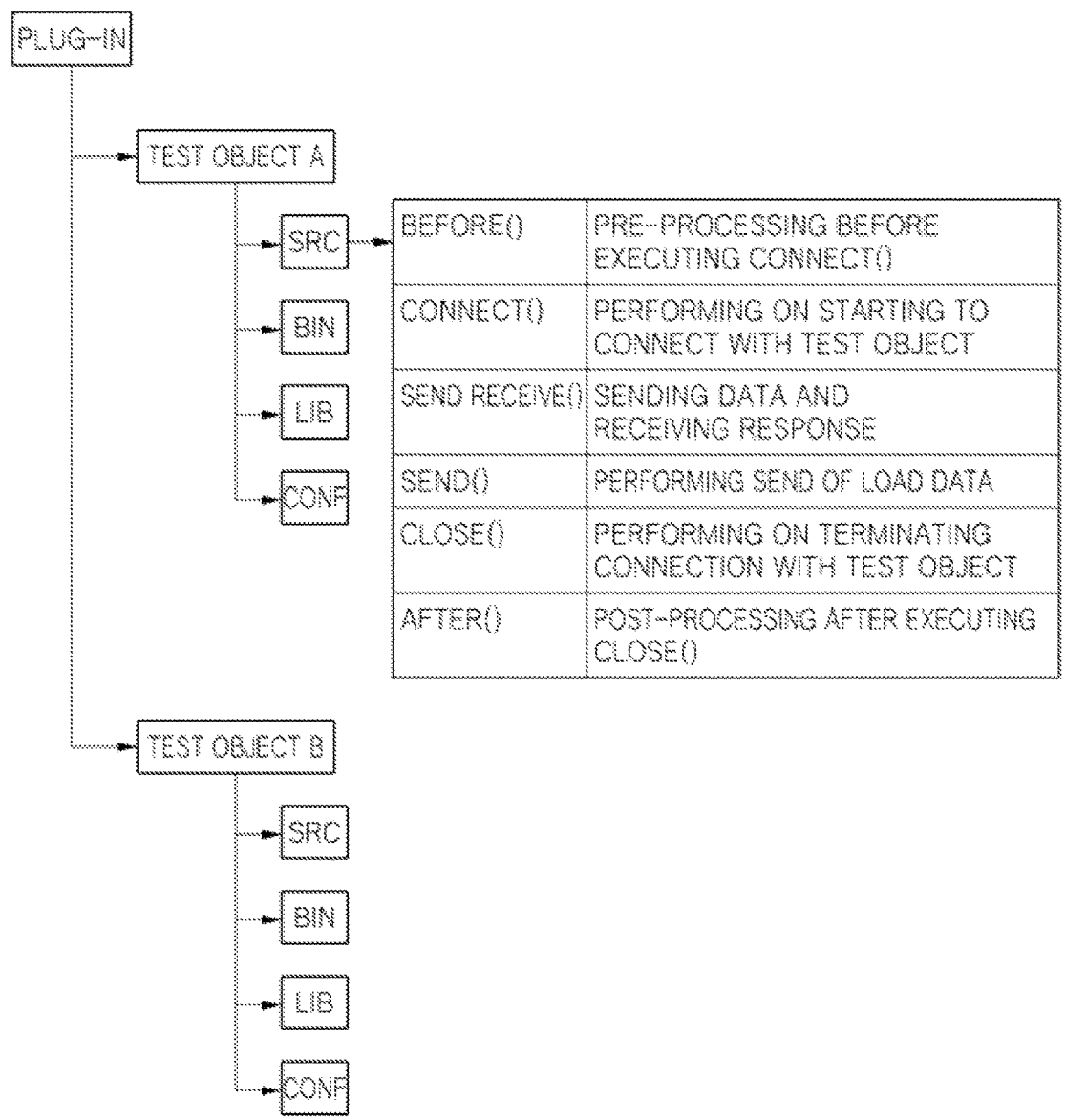
FIG. 3 is an example diagram for a protocol plug-in component in FIG. 2.

FIG. 3 is an exemplary diagram for a protocol plug-in component of FIG. 2. The protocol plug-in component 210 may connect with the test object 110 through a plug-in as illustrated in FIG. 3, and may process in order to communicate under a corresponding protocol according to the protocol of the test object 110 to send data to the test object 110 or to send data to the test object 110 and receive a response.

Referring to FIG. 3, protocols for the plurality of the test objects may be implemented on the plug-in through a tree structure. A plurality of directories may be implemented for each of the protocols of the plurality of the test objects according to a protocol of a corresponding test object. For example, a protocol for test object A and test object B may be defined in the plug-in. The directories corresponding to src, bin, lib and conf may be implemented according to the protocol of the test object 110 for each of the test object A and test object B.

The src directory may include an original program generating an execution file and may be formed on six methods (or functions). Herein, the six methods may correspond to before( ), connect( ), sendReceive( ), send( ), close( ), and after( ). Here, before( ) may pre-process before executing connect( ), connect( ) may perform on starting to connect with the test object through the protocol of the test object, sendReceive( ) may send data and receive a response, send( ) may send the data, close( ) may perform on terminating a connection with the test object and after( ) may post-process after executing close( ).

The bin directory may include the execution file generated on the original file recorded on the src directory, may call a corresponding module in a common process to be connected with the test object 110 and may send data to the test object 110 or send the data and receive a response.

The lib directory may be a library directory for connecting with the test object 110 and may call a corresponding library when the execution file in the bin directory connects with the test object 110, send the data to the test object 110 or send the data and receive a response.

The conf directory may be a configured file directory for connecting with the test object 110, and the execution file in the bin directory may call a corresponding configuration file in the conf directory according to a need.

Figure 4:
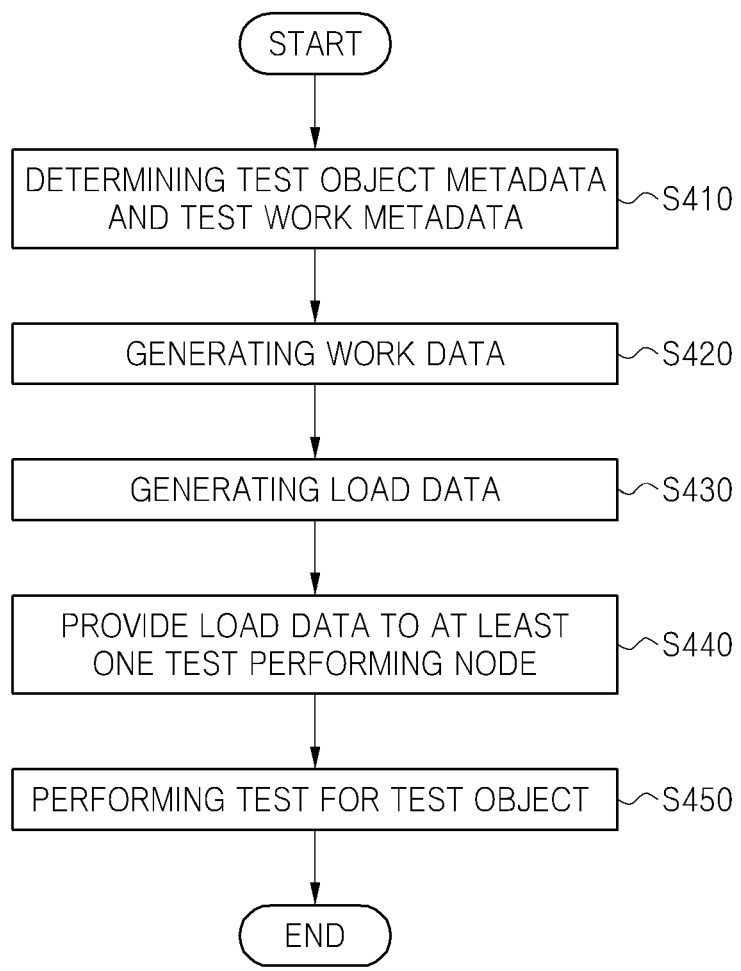
FIG. 4 is a flow chart showing a performance testing method being performed in a performance testing system of FIG. 1.

FIG. 4 is a flow chart showing a performance testing method performed in a performance testing system of FIG. 1. The main controller 150 may determine the test object metadata and the test work metadata, in step S410. Here, the test object metadata may correspond to a protocol and destination information of the test object 110. For example, the test object metadata may correspond to IP, port and protocol types if the test object 110. The test work metadata may correspond to information for a structure for the specific job. The main controller 150 may determine the test object metadata and the test work metadata to send to the load data generator 140.

The load data generator 140 may generate the job data based on the test object metadata and the test job metadata received from the main controller 150. Here, the job data may correspond to data for the specific job being generated based on the test job metadata. For example, the job data may correspond to a definition for data size for the specific job and the search job for the specific data.

The load data generator 140 may generate the load data based on the test object metadata, the test job metadata and the job data, in step S430. The load data may correspond to the byte type three-dimensional array structure. Here, the performance test for the test object 110 may be applied to various test objects through the load data of the byte type three-dimensional array structure independently of a specific test object to be performed.

The load data generator 140 may provide the load data to the at least one test performing node 140, in step S440, and may cause the at least one test performing node 130 receiving the load data to test a performance for the test object 110, in step S450. The step S450 for testing the performance for the test object 110 will be described in further detail hereinafter.

The at least one test performing node 130 that receives the load data may check whether access information (e.g., IP, Port and protocol types) which are included in the load data matches the protocol of the test object 110 and may connect with the test object 110 using the protocol of the test object 110.

After the at least one test performing node 130 is connected with the test object 110, the at least one test performing node 130 may record an access time before sending the load data to the test object 110. Here, the access time may be stored in the database. Also, the at least one test performing node 130 may store data for the specific job request for the test object 110 with the access time before sending the load data.

The test object 110 may perform the specific job based on the load data received from the at least one test performing node 130 to send the performance result to a corresponding test performing node 130.

The at least one test performing node 130 may record an access time after receiving the performance result of the specific job from the test object 110 to store the access time in the database. Also, data for the performance result of the specific job may be stored in the database.

The at least one test performing node 130 may generate log data based on the access time before sending the load data stored in the database and the access time after a completion of the specific job to store the log data in the database. The at least one test performing node 130 may then complete the connection with the test object 110.

The main controller 150 may calculate the performance for the test object 110 based on the log data stored in the database. Here, the index of the performance test may correspond to a number of processed jobs during a specific time period.

As broadly described and embodied herein, a performance testing method may enable testing a performance of a system or a device using a specific protocol. The performance testing method may enable use of load data having a three-dimensional array structure to flexibly test a performance independently of a performance test object. Moreover, the performance testing method of the present disclosure may enable processing load data through a protocol plug-in component for performing data input and output according to a performance test object protocol and expanding a protocol of a performance test object to test a performance of a performance test object using a protocol of various types.

In at least one embodiment, a performance testing method may include determining test object metadata defining a test object protocol and test job metadata defining a test of a specific work, generating work data based on the test work metadata, generating load data according to the specific work to provide the load data to at least one test performing node and causing the at least one test performing node to perform a performance test for a test object.

In at least one embodiment, the load data may correspond to a multi-dimensional array structure including the test object metadata, the test work metadata and the work data.

In at least one embodiment, the at least one test performing node may be virtually implemented.

In at least one embodiment, the at least one test performing node may include a process component and a protocol plug-in component, the process component including a pre-process module, a common process module and a post process module, the protocol plug-in component defining a protocol as a library and processing the load data for communicating through the test object protocol.

In at least one embodiment, the protocol plug-in component may perform at least one of pre-processing before connecting with the test object, connecting with the test object, sending the load data and receiving a response from the test object, sending the load data, terminating the connection with the test object and post-processing after terminating the connection with the test object.

In at least one embodiment, the protocol plug-in component may include a library for a plurality of test objects through a tree structure.

In at least one embodiment, causing the at least one test performing node to perform the performance test for the test object may include verifying the test object protocol based on test object metadata included in the load data.

In at least one embodiment, causing the at least one test performing node to perform the performance test for the test object may further include causing the at least one test performing node to be connected to the test object through the test object protocol.

In at least one embodiment, causing the at least one test performing node to perform the performance test for the test object may include generating logging data based on an access time before sending the load data to the test object and an access time after receiving a completion of performing the specific work from the test object.

In at least one embodiment, the method may further include calculating a performance testing result for the test object based on the logging data.

In at least one embodiment, a performance testing apparatus may include a main controller determining test object metadata defining a test object protocol and test work metadata defining a test of a specific work, a load data generator generating work data based on the test work metadata and generating load data according to the specific work to provide the load data to at least one test performing node and the at least one test performing node may perform a performance test for the test object.

In at least one embodiment, the at least one test performing node may verify the test object protocol based on the test object metadata including the load data.

In at least one embodiment, the at least one test performing node may be connected to the test object through the test object protocol.

In at least one embodiment, the at least one test performing node may generate logging data based on an access time before sending the load data to the test object and an access time after receiving a completion of performing the specific work from the test object.

In at least one embodiment, the main controller may calculate a performance testing result for the test object based on the logging data.

In at least one embodiment, a machine-readable non-transitory medium storing a computer program for a performance testing method, the machine-readable non-transitory medium having stored thereon machine-executable instructions for determining test object metadata defining a test object protocol and test work metadata defining a test of a specific work, generating work data based on the test work metadata, generating load data according to the specific work to provide the load data to at least one test performing node and causing the at least one test performing node to perform a performance test for a test object.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An adaptable performance testing method for testing performance of a plurality of target test objects configured for different communication protocols, the method comprising:

determining, at a controller, a first test object metadata that defines a first communication protocol for a first test object and a first test job metadata that defines a first performance test using a first prescribed job for the first test object, and determining a second test object metadata that defines a second communication protocol for a second test object and a second test job metadata that defines a second performance test using a second prescribed job for the second test object, wherein the first communication protocol for the first test object and the second communication protocol for the second test object are different communication protocols and the first test object metadata and the second test object metadata include information for IP, port and protocol type, and wherein the first test object and the second test object are end user devices that communicate over the first communication protocol or the second communication protocol;

generating job data based on the first or second test job metadata;

generating load data according to the first prescribed job or the second prescribed job to provide the load data to at least one test performing node among a plurality of test performing nodes coupled to the first test object or the second test object, wherein the load data has a multi-dimensional array structure including the first or second test object metadata, the first or second test job metadata and the job data, wherein the test job metadata correspond to structure information for actual data being obtained as a testing result of a specific job; and transferring the load data from the controller to the at least one test performing node and causing the at least one test performing node to transfer the job data to the first or second test object to perform the first or the second performance test for the first test object or the second test object, wherein the at least one test performing node stores a first time when transferring the job data, causes the first or second test object to perform a prescribed function respectively associated with the first or second test object using the job data, and stores a second time after completion of the prescribed function, wherein a performance testing result is calculated based on a difference between the first time and the second time which includes time for transmitting data over the first communication protocol or the second communication protocol and time for performing the prescribed function at the first or second test object, wherein the at least one test performing node includes a protocol plug-in component that defines the first communication protocol for the first test object and the second communication protocol for the second test object in a library and processes the load data for communicating through the first communication protocol for the first target object and the second communication protocol for the second target object, wherein the first communication protocol or the second communication protocol is adaptively selected using the protocol plug-in component to correspond to a communication protocol of the target test objects, and wherein the protocol plug-in component uses dynamic link library (DLL) to connect to the first test object and the second test object based on different communication protocols.

2. The method of claim 1, wherein the at least one test performing node is virtually implemented.

3. The method of claim 1, wherein the at least one test performing node includes a process component that includes a pre-process module, a common process module and a post process module.

4. The method of claim 3, wherein the protocol plug-in component performs at least one of pre-processing before connecting with the first or second test object, connecting with the first or second test object, sending the load data and receiving a response from the first or second test object, sending the load data, terminating the connection with the first or second test object or post-processing after terminating the connection with the first or second test object.

5. The method of claim 3, wherein causing the at least one test performing node to perform the first or second performance test for the first test object or the second test object includes verifying the communication protocol for the first test object or the second test object based on the first or second test object metadata included in the load data.

6. The method of claim 5, wherein causing the at least one test performing node to perform the first or second performance test for the first test object or the second test object includes causing the at least one test performing node to be connected to the first or second test object based on a respective communication protocol of the first or second test object.

7. An adaptable performance testing apparatus configured to test a performance of a plurality of target test objects configured for different communication protocols, comprising:

a main controller that determines test object metadata that defines a communication protocol for a first test object or a second test object and test job metadata that defines a performance test using a prescribed job for the first test object or the second test object, wherein the first and second test objects are configured for communication on different communication protocols and the test object metadata includes information for IP, port and protocol type, and wherein the first test object and the second test object are end user devices that communicate over the first communication protocol or the second communication protocol; and a load data generator that generates job data based on the test job metadata and generating load data according to the prescribed job to transfer the load data to at least one test performing node and the at least one test performing node transferring job data to the first or second test object, wherein the load data has a multi-dimensional array structure including the first or second test object metadata, the first or second test job metadata and the job data, wherein the test job metadata correspond to structure information for actual data being obtained as a testing result of a specific job, wherein the at least one test performing node stores a first time when transferring the job data, causes the first or second test object to perform a prescribed function respectively associated with the first or second test object using the job data, and stores a second time after completion of the prescribed function, wherein a performance testing result is calculated based on a difference between the first time and the second time which includes time for transmitting data over the first communication protocol or the second communication protocol and time for performing the prescribed function at the first or second test object, wherein the at least one test performing node includes a protocol plug-in component that defines the first communication protocol for the first test object and the second communication protocol for the second test object in a library and processes the load data for communicating through the first communication protocol for the first target object or the second communication protocol for the second target object, wherein the protocol plug-in component uses dynamic link library (DLL) to connect to the first test object and the second test object based on different communication protocols, and wherein the at least one test performing node performs the performance test for the first or second test object.

8. The apparatus of claim 7, wherein the at least one test performing node verifies the communication protocol of the first or second test object based on the test object metadata including the load data.

9. The apparatus of claim 8, wherein the at least one test performing node is connected to the first or second test object based on the communication protocol of the first or second test object.

10. A machine-readable non-transitory medium for storing a computer program for an adaptable performance testing method for testing performance of a plurality of target test objects configured for different communication protocols, the machine-readable non-transitory medium having stored thereon machine-executable instructions for:

determining a first test object metadata defining a communication protocol for a first test object and a first test job metadata defining a first performance test using a first prescribed job for the first test object, and determining a second test object metadata that defines a second communication protocol for a second test object and a second test job metadata that defines a second performance test using a second prescribed job for the second test object, wherein the first communication protocol for the first test object and the second communication protocol for the second test object are different communication protocols and the first test object metadata and the second test object metadata include information for IP, port and protocol type, and wherein the first test object and the second test object are end user devices that communicate over the first communication protocol or the second communication protocol;

generating job data based on the test job metadata;

generating load data according to the first prescribed job or the second prescribed job to provide the load data to at least one test performing node among a plurality of test performing nodes coupled to the first test object or the second test object, wherein the load data has a multi-dimensional array structure including the first or second test object metadata, the first or second test job metadata and the job data, wherein the test job metadata correspond to structure information for actual data being obtained as a testing result of a specific job; and transferring the load data from the controller to the at least one test performing node and causing the at least one test performing node to transfer the job data to the first or second test object to perform the first or the second performance test for the first test object or the second test object, wherein the at least one test performing node stores a first time when transferring the job data, causes the first or second test object to perform a prescribed function respectively associated with the first or second test object using the job data, and stores a second time after completion of the prescribed function, wherein a performance testing result is calculated based on a difference between the first time and the second time which includes time for transmitting data over the first communication protocol or the second communication protocol and time for performing the prescribed function at the first or second test object, wherein the at least one test performing node includes a communication protocol plug-in component that defines the first communication protocol for the first test object and the second communication protocol for the second test object in a library and processes the load data for communicating through the first communication protocol for the first target object and the second communication protocol for the second target object, and wherein the protocol plug-in component uses dynamic link library (DLL) to connect to the first test object and the second test object based on different communication protocols.

11. The method of claim 1, wherein the multi-dimensional array structure is a byte type three-dimensional array structure including a first array corresponding to the first or second test object metadata, a second array corresponding to the first or second test job metadata, and a third array corresponding to the job data.

* * * * *